United States Patent [19]
Grezzo Page et al.

[11] Patent Number: 5,708,095
[45] Date of Patent: Jan. 13, 1998

[54] GRAFT COPOLYMERS CONTAINING SULFONATE AND PHOSPHONATE GROUPS HAVING PARTICULAR UTILITY AS PIGMENTED INK DISPERSANTS

[75] Inventors: Loretta Ann Grezzo Page, Newark; Milan Bohuslav Bednarek, Wilmington, both of Del.

[73] Assignee: E. I. du Pont de Nemours and Company, Wilmington, Del.

[21] Appl. No.: 706,420

[22] Filed: Aug. 30, 1996

[51] Int. Cl.$^6$ .................. C08F 267/02; C08F 267/06; C08F 267/08

[52] U.S. Cl. .................. 525/301; 525/309; 525/291; 524/504

[58] Field of Search .................. 525/301, 309, 525/291; 524/504

[56] References Cited

U.S. PATENT DOCUMENTS

| | | | |
|---|---|---|---|
| 4,521,565 | 6/1985 | Toaba et al. | 525/64 |
| 4,597,794 | 7/1986 | Ohta et al. | 106/20 |
| 5,085,698 | 2/1992 | Ma et al. | 106/20 |
| 5,231,131 | 7/1993 | Chu et al. | 524/504 |
| 5,256,597 | 10/1993 | Suzuki et al. | 430/262 |
| 5,410,005 | 4/1995 | Nemoto et al. | 526/245 |

FOREIGN PATENT DOCUMENTS

| | | | |
|---|---|---|---|
| 6-100810 | 4/1994 | Japan | C09D 11/00 |

*Primary Examiner*—Irina S. Zemel

[57] ABSTRACT

A graft polymer having (a) a hydrophilic backbone prepared from unneutralized acid containing monomers wherein the acid has a pKa of at least 3, and wherein the backbone is completely soluble in water and insoluble in non-polar organic solvents; and (b) at least one discrete hydrophobic side chain, wherein 20 to 100% of the side chains are prepared from non-polar aliphatic or aromatic monomers having a chain length of at least 4 carbon atoms; wherein the side chains are attached to the backbone at a single terminal point and wherein the at least one discrete hydrophobic side chain has a weight average molecular weight of 1000 to 30,000. These graft polymers are useful as dispersants in aqueous solutions, particularly in ink jet inks.

9 Claims, No Drawings

GRAFT COPOLYMERS CONTAINING SULFONATE AND PHOSPHONATE GROUPS HAVING PARTICULAR UTILITY AS PIGMENTED INK DISPERSANTS

FIELD OF THE INVENTION

This invention relates to novel graft polymers having sulfonate or phosphonate groups. This invention also relates to their use as dispersants in aqueous dispersions. The graft copolymers have particular utility as dispersants in inks for ink jet printing.

BACKGROUND OF THE INVENTION

Ink jet printing is a non-impact process in which digital signals produce droplets of ink on substrates such as paper or transparency films. Pigments are preferred ink colorants due to their lightfastness and their potential to offer waterfastness and resistance to smear and smudge. The pigmented ink, however, must be stable to flocculation and settling throughout the life of the ink.

In thermal ink jet printing, resistive heating is used to vaporize the ink, which then is expelled through a printhead orifice onto a substrate. Composition of the ink changes dramatically during the process, which tends to cause pigment particles to flocculate in or near the printhead orifices. Ink drops may be misdirected as a result, and in extreme cases the orifices may become plugged.

The ink typically contains many organic additives (e.g., thickeners and thixotropic agents) to adjust its physical properties. Organic cosolvents generally are included to improve ink penetration into the printing substrate, and surfactants typically are added to decrease ink dry-time after printing. As the ink dries, concentration of these components increases, jeopardizing stability of the pigment dispersion that is necessary to obtain uniformity and color quality of the printed image.

Pigment dispersions generally are stabilized by either a non-ionic or ionic technique. When the non-ionic technique is used, the pigment particles are stabilized by a polymer having a hydrophilic section that extends into the water medium, providing entropic or steric stabilization. Polyvinyl alcohol, cellulosics, ethylene oxide modified phenols, and ethylene oxide/propylene oxide polymers may be used for this purpose. While the non-ionic technique is not sensitive to pH changes or ionic contamination, it has a major disadvantage in that the printed image is water sensitive.

In the ionic technique, the pigment particles are stabilized using the polymer of an ion containing monomer, such as neutralized acrylic, maleic, or vinyl sulfonic acid. The polymer provides stabilization through a charged double layer mechanism whereby ionic repulsion hinders the particles from flocculation. Since the neutralizing component tends to evaporate after printing, the polymer then has reduced water solubility and the printed image is not water sensitive.

Dispersants having random, block, and graft polymeric structures have been proposed in the art. U.S. Pat. No. 4,597,794 to Canon discloses aqueous ink dispersions wherein the pigment particles are dispersed using a polymer having ionic hydrophilic segments and aromatic hydrophobic segments that adhere to the pigment surfaces. U.S. Pat. No. 5,085,698 to DuPont discloses use of AB and BAB block polymer dispersants, which now are used in commercial inks for thermal ink jet printers. Unexamined Japanese application JP6-100,810 to Canon discloses using certain graft copolymers having a hydrophilic portion containing acid groups and a hydrophobic portion primarily composed of styrenes and alkyl esters of meth(acrylic acid).

While random polymeric dispersants such as those proposed in U.S. Pat. No. 4,597,794 can be prepared readily using conventional polymerization techniques, structured polymeric dispersants such as those taught in U.S. Pat. No. 5,085,698 usually provide better dispersion stability. The structured polymers, however, are more difficult to manufacture and require raw materials having a high purity. The graft copolymers proposed in JP6-100,810 are prepared in an elaborate multi-step process generally requiring purification steps before the macromonomers can be used in the synthesis of the final graft copolymer.

Accordingly, there is an ongoing need for improved aqueous pigmented inks for ink jet printing using dispersants that are easily prepared and that provide excellent stability of the ink during the demanding conditions of ink jet printing.

SUMMARY OF THE INVENTION

One aspect of the invention provides a graft copolymer with:

(a) a hydrophilic backbone wherein 2 to 100% of the backbone is prepared from monomers containing an acid which, in unneutralized form, has a pKa of up to or equal to 3, and wherein the backbone is soluble in water and insoluble in non-polar organic solvents; and (b) at least one discrete hydrophobic side chain, wherein 20 to 100% of the side chain(s) are prepared from non-polar aromatic monomers or aliphatic monomers having a chain length of at least 4 carbon atoms;

wherein (i) at least one side chain has a weight average molecular weight in the range of 1,000 to 30,000 and (ii) the weight ratio of hydrophobic side chain(s) to hydrophilic backbone is in the range of 90:10 to 10:90.

Another aspect of the invention provides an aqueous dispersion wherein the graft copolymer is a dispersant for particles in an aqueous carrier medium. The dispersions have broad compatibility with water miscible organic cosolvents, and with additives such as thickeners, latex emulsions, and the like. When used as an ink for thermal ink jet printers, the dispersions have been found to be extremely stable during the printer firing cycle, as the ink composition rapidly changes, and to produce printed images having high color strength and excellent gloss.

DETAILED DESCRIPTION OF THE INVENTION

Graft Copolymer

The graft copolymer has a hydrophilic portion that is soluble in an aqueous carrier medium, and a hydrophobic portion that binds to particulate solids, such as pigments, that are insoluble in the medium. The ratio of hydrophobic to hydrophilic portions is in the range of 90:10 to 10:90, preferably 20:80 to 50:50, by weight. The hydrophilic portion is conveniently built into the backbone, with the hydrophobic portion concentrated in the side chains.

Side Chains

The hydrophobic side chains are prepared from ethylenically unsaturated monomers and contain at least 20% by weight, based on the total weight of the hydrophobic portion, of monomer(s) selected from the group consisting of aryl esters of acrylic acid, aryl esters of methacrylic acid, N-aryl acrylamide, N-aryl methacrylamide and vinyl aryl esters. The term "aryl" includes substituted aryl, substituted alkylaryl, unsubstituted aryl, and unsubstituted alkylaryl groups, and alkylaryl ethers. These monomers are characterized by the following formulae:

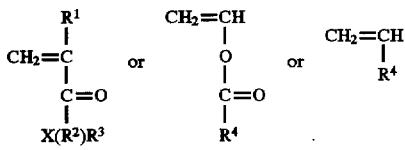

where $R^1$ is selected from the group of H and $CH_3$; X is selected from the group of N and O; when X is N, $R^2$ and $R^3$ are selected independently from the group consisting of H, substituted alkyl, substituted aryl, substituted alkylaryl, unsubstituted alkyl, unsubstituted aryl, alkylaryl ethers and unsubstituted alkylaryl groups provided that either $R^2$ or $R^3$ contains at least one aryl or alkylary group; when X is O, $R^2$ does not exist and $R^3$ is selected from the group consisting of substituted aryl or alkylaryl groups, and unsubstituted aryl or alkylaryl groups; and $R^4$ is selected from the group consisting of substituted aryl or alkylaryl groups, and unsubstituted aryl or alkylaryl groups. The term "substituted" aryl or alkylaryl as used herein means an aryl group that contains one or more substituents that do not interfere with the polymerization process. Representative substitutents are alkyl, hydroxy, amino, ester, acid, acyloxy, amide, nitrile, halogen, haloalkyl, alkoxy. Some examples of useful monomers include phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, 1-naphthalyl acrylate, 2-naphthalyl acrylate, 2-naphthalyl methacrylate, p-nitrophenyl acrylate, p-nitrophenyl methacrylate, phthalimidomethyl acrylate, phthalimidomethyl methacrylate, N-phenyl acrylamide, N-phenyl methacrylamide, N-benzyl acrylamide, N-benzyl methacrylamide, N-(2-phenylethyl) acrylamide, N-(2-phthalimidoethoxymethyl) acrylamide, vinyl benzoate, methyl acrylate, ethyl acrylate, n-butyl acrylate, 2-ethylhexyl acrylate, methyl methacrylate, ethyl methacrylate, n-butyl methacrylate, t-butyl methacrylate, 2-ethylhexyl methacrylate, cyclohexyl methacrylate, styrene, a-methyl styrene, vinyl acetate, vinyl butyrate, and the like.

The hydrophobic side chain also may contain up to 20% by weight, preferably 1 to 10% by weight, based on the total weight of the graft copolymer, of hydrophilic ionic monomers which are listed hereinafter. The hydrophobic side chain may also contain up to 40% by weight, preferably 10 to 30% by weight, based on the total weight of the graft copolymer, of a non-ionic hydrophilic monomers described hereinafter to fine-tune the hydrophobicity/hydrophilicity balance and adjust the solubility properties of the hydrophobic side chains.

The hydrophobic side chain may also contain up to 30% by weight, based on the total weight of the graft copolymer, of monomers having functional groups that enhance the pigment binding force. For example, monomers with amine groups, such as N,N-dimethylaminoethyl acrylate, may be incorporated in the hydrophobic portion to bind with pigments having acidic groups on the surface. Monomers with acid groups such as 2-acrylamido-2-propane sulfonic acid or methacrylic acid may be incorporated in the hydrophobic portion to bind pigments with basic surfaces.

Backbone

The hydrophilic backbone is soluble in the selected aqueous carrier medium, and is prepared from ethylencially unsaturated monomer(s). Between 2 to 100% (preferably 5 to 90%) by weight of the backbone is prepared using monomer having a pKa less than or equal to 3. Examples of useful monomers are 2-acrylamido-2-propane sulfonic acid, sulfopropyl methacrylate, sulfopropyl acrylate, vinyl phosphonic acid, and vinyl sulfonic acid. The salts of all of these acids can be used. For example, sodium styrene sulfonic acid, sodium 2-acrylamido-2-propane sulfonic acid, potassium 2-acrylamido-2-propane sulfonic acid, ammonium 2-acrylamido-2-propane sulfonic acid, ammonium vinyl sulfonic acid, and sulfopropyl acrylate-potassium salt may be selected.

Other ionizable acidic polymers may be added to balance the hydrophilic and solubility properties of the hydrophilic backbone. Useful monomers include acrylic acid, methacrylic acid, crotonic acid, itaconic acid, itaconic acid monoester, maleic acid, maleic acid monoester, fumaric acid, fumaric acid monoester, and the like.

The acid groups of the aforementioned acidic, ionizable monomers may be blocked for polymerization processes that are sensitive to active hydrogens, such as anionic or group transfer polymerization. The blocking groups then are removed after the polymerization. Some examples of blocked monomers that generate acrylic or methacrylic acid after removal of the blocking group include trimethylsilyl acrylate, trimethylsilyl methacrylate, 1-butoxyethyl acrylate, 1-butoxyethyl methacrylate, 1-ethoxyethyl acrylate, ethoxyethyl methacrylate, 2-tetrahydropyranyl acrylate, and 2 tetrahydropyranyl methacrylate. Similar groups may be used to block the acidic groups of the sulfonic acids, phosphonic acids, or other acids with a pKa less than or equal to 3.

The non-ionic hydrophilic monomers having the following formula may be conveniently used to fine-tune the hydrophobicity/hydrophilicity balance and to adjust the solubility properties of the graft copolymers:

wherein n is 0 or 1; when n is 1, X is an alkyl, aryl, or alkylaryl diradical connecting group of 1 to 9 carbon atoms; m is 1 to 100; $R^3$ is H or $CH_3$; and $R^4$ is selected from the group consisting of H and alkyl groups of 1 to 4 carbon atoms. Some examples of useful comonomers are 2-hydroxyethyl acrylate, 2-hydroxyethyl methacrylate, hydroxypropyl acrylate, 2-(2-methoxyethoxy)ethyl acrylate, 2-(2-methoxyethoxy)ethyl methacrylate, ethoxytriethyleneglycol methacrylate, methoxy polyethyleneglycol monomethacrylate (molecular weight of 200–4000, preferably 200–2000), and polyethyleneglycol monomethacrylate (molecular weight 200–4000, preferably 200–2000).

Other commonly used ethylenically unsaturated monomers may be copolymerized into the hydrophilic portion provided they are used at a concentration that will not drastically change the solubility properties of the hydrophilic portion in the selected aqueous carrier medium. Some useful examples include the alkyl acrylates and alkyl methacrylates with the alkyl group having 1 to 12 carbons such as, methyl acrylate, methyl methacrylate, ethyl acrylate, ethyl methacrylate, butyl acrylate, butyl methacrylate, and the like, and acrylamides and methacrylamides.

Preparation

The most efficient method for making the graft copolymers is by using macromonomers. The macromonomer with a terminal polymerizable double bond will become the side chain of the graft copolymer, and is prepared first. It is then copolymerized with the monomers chosen for the backbone composition. The macromonomers are most conveniently prepared by the free radical polymerization method employing cobalt (II) and cobalt (III) complexes as catalytic chain transfer agents or organic chain transfer agents that are capable of chain transfer by addition fragmentation mechanism. The organic chain transfer agents include allylic sulfides, allylic bromides, methacrylic dimers, a-methylstyrene dimer and related compounds. The cobalt complexes are preferred because they are effective in controlling the molecular weights of the polymers produced, and also act to produce polymer compositions containing a very high percentage of macromonomers. Preferred cobalt chain transfer agents are disclosed in U.S. Pat. No. 4,680, 352 to Janowicz et al and U.S. Pat. No. 4,722,984 to Janowicz. The cobalt chain transfer agent may be employed in a concentration range of approximately 1×10-8M to 5×10-3M. The optimal concentration is dependent on the desired molecular weight and can be obtained through routine experimentation. By using the suggested range of the concentrations for the chain transfer agents, macromonomers are readily prepared having a molecular weight in the range of 1,000 to 50,000, preferably 1,000 to 10,000.

The macromonomer is then copolymerized with monomers selected for the backbone via the conventional free radical polymerization method. The molecular weight of the final graft copolymer may be controlled by many methods known in the art. The graft copolymers useful for the present invention have a weight average molecular weight of about 1,000–100,000, preferably 3,000–75,000, more preferably 5,000–50,000.

Many common organic solvents are suitable as the polymerization media for preparation of both macromonomers and the graft copolymers. These include alcohols, such as methanol, ethanol, n-propanol and isopropanol; ketones, such as acetone, butanone, pentanone and hexanone; ethers, such as tetrahydrofuran, diethyl ether; commonly available ethylene glycol and polyethylene glycol monoalkyl and dialkyl ethers, such as cellosolves and carbitols; alkyl esters of acetic, propionic, and butyric acids; glycols, such as ethylene glycol; and mixtures thereof. Mixtures of low molecular weight alcohols, such as ethanol and isopropanol, and low molecular weight ketones, such as acetone, are particularly useful for preparing macromonomers with high acid content.

Commonly used azo polymerization initiators are suitable for preparation of both macromonomers and the graft copolymers, provided it has solubility in the solvents and monomer mixture solution, and has an appropriate half life at the temperature of polymerization. "Appropriate half life", as used herein, is a half life of about 10 minutes to 4 hours. Some examples of such initiators include 2,2'-azobis (isobutyronitrile), 2,2'-azobis(2,4-dimethylvaleronitrile), 2,2' azobis (methylbutyronitrile), and 1,1'-azobis (cyanocyclohexane). Other non-azo initiators including, among others, benzoyl peroxide, lauroyl peroxide, also may be used provided they do not adversely react with chain transfer agents under the reaction conditions for macromonomers.

If may be desired to neutralize the salts of the acid groups used in this invention. Salts of the acid groups are prepared by neutralizing them with bases. Some examples of useful bases include alkali metal hydroxides (lithium, sodium, and potassium hydroxide), alkali metal carbonate and bicarbonate (sodium and potassium carbonate and bicarbonate), organic amines (mono-, di-, tri-methylamine, morpholine, N-methylmorpholine), organic alcohol amines (N,N-dimethylethanolamine, N-methyl diethanolamine, mono-, di-, tri-ethanolamine), ammonium salts (ammonium hydroxide, tetra-alkyl ammonium hydroxide), and pyridine.

Preferred graft polymers include 2-acrylamido-2-propane sulfonic acid-co-methyl acrylate-g-ethoxytriethyleneglycol methacrylate-co-benzyl methacrylate, 25/45//21/9% by weight; 2-acrylamido-2-propane sulfonic acid, sodium salt-co-methyl acrylate-g-ethoxytriethyleneglycol methacrylate-co-benzyl methacrylate, 30/40//21/9% by weight; 2-acrylamido-2-propane sulfonic acid-co-methyl acrylate-g-ethoxytriethyleneglycol methacrylate-co-benzyl methacrylate, 25/45//18/12% by weight; 2-acrylamido-2-propane sulfonic acid-co-methyl acrylate-g-ethoxytriethyleneglycol methacrylate-co-butyl methacrylate, 25/45//15/15% by weight; and 2-acrylamido-2-propane sulfonic acid-co-methyl acrylate-co-acrylic acid-g-ethoxytriethyleneglycol methacrylate-co-benzyl methacrylate, 25/20/25//18/12% by weight.

Ink for Ink Jet Printing

The graft copolymer is particularly suited for preparing aqueous dispersions of particulate materials in general, and has special utility as a dispersant for colorant particles in aqueous inks particularly adapted for ink jet printing. The resulting inks exhibit exceptional stability during storage and the printing operation, and provide a printed image having high color strength, excellent gloss, and a high degree of light and water fastness.

Aqueous Carrier Medium

The aqueous carrier medium is water or a mixture of water and at least one water soluble organic component. Deionized water is commonly used. The organic component may be an organic solvent, polymeric binder, thickener, thixotropic agent, coating aid, etc.

For ink jet inks, the aqueous carrier medium typically is a mixture of water and at least one water-soluble organic solvent. Representative examples of water-soluble organic solvents are disclosed in U.S. Pat. No. 5,085,698 issued Feb. 4, 1992. Selection of a suitable mixture of water and water soluble organic solvent depends upon physical demands of the specific application, such as desired surface tension and viscosity, the selected pigment, drying time, and the type of media substrate onto which the ink will be printed. A mixture of diethylene glycol and deionized water is preferred as the aqueous carrier medium for ink jet inks, with the composition containing between 30% and 95%, preferably 60% to 95% water, by weight based on the total weight of the composition.

Particulate Solids

The particulate solid may be a pigment, colloidal silver halide, metallic flake, a herbicide, an insecticide, or biomaterials such as drugs, etc. depending upon the particular application. For example, if the intended use is in an ink or a paint, the particulate solid is a pigment or a mixture of two or more pigments. The term "pigment" as used herein means an insoluble colorant.

The selected solid must be capable of binding with the graft polymer. In other words, the particulate solid must have "binding sites" that will bind with the polymer. Most of the above-mentioned solids have very specific functional groups on their surfaces.

For example, in the case of pigments, all carbon blacks have chemisorbed oxygenated complexes, primarily acidic in nature (e.g. carboxylic, quinonic, lactonic or phenolic groups) on their surfaces to varying degrees depending on the conditions of manufacture. These acidic groups provide binding sites for dispersants with basic functional groups, such as amines. Other pigments with acidic or basic functional groups on their surface, or which can by modified to contain such groups, are also known in the art. Furthermore, almost all of the organic color pigments and many of the surface treatment compounds have aromatic features in their structures, providing sites for additional aromatic interactions with the dispersant. Examples of pigments that may be used to advantage include azo, anthraquinone, thioindigo, oxazine, quinacridone, lakes and toners of acidic dye stuffs or basic dye stuffs, copper phthalocyanine and its derivatives, and various mixtures and modifications thereof.

The particle size has an influence on the dispersion stability. Brownian motion of minute particles help prevent the particles from flocculation and settling. The particular particle size should thus be selected to optimize the stability of the dispersion, consistent with the other requirements of the particular intended application of the dispersion.

For example, in ink jet inks, the pigment particles need to be sufficiently small to permit free flow of the ink through the ink jet printing device, especially at the ejecting nozzles that usually have diameter ranging from 10 micron to 50 micron. In addition, it is also desirable to use small particles for maximum color strength and gloss. For ink jet inks, the range of useful particle size is approximately 0.005 micron to 15 micron, and preferably between 0.01 to 5 microns, more preferably from 0.01 to 1 micron.

Also in the case of pigments, the selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in the aforementioned U.S. Pat. No. 5,085,698.

Fine particles of metal or metal oxides (such as copper, iron, steel, aluminum, silica, alumina, titania, and the like) also may be used to practice the invention and may find application in the preparation of magnetic ink jet inks.

Other Ingredients

Depending on the requirements for the application, various types of aqueous additives can be used to modify the properties of the dispersion, as known in the art. Examples include organic cosolvents, coalescing agents, polymeric binders including the water soluble polymers and the water dispersible latex emulsions, thickeners, thixotropic agents, surfactants, coating aids, biocides, sequestering agents, etc.

For ink jet ink applications, anionic, cationic, nonionic, or amphoteric surfactants may be present in the amount of 0.01 to 5% and preferably 0.2 to 2%, based on the total weight of the ink. Biocides such as Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.) and sodium benzoate; sequestering agents such as EDTA; and other known additives, such as humectants, viscosity modifiers and other acrylic or non-acrylic polymers may also be added to improve various properties of the ink compositions.

In a preferred embodiment, the present dispersions are employed as pigment dispersions for aqueous ink jet ink compositions prepared in any of the conventional methods known in the art.

For example, the selected pigment conveniently is added to the aqueous carrier medium, either concurrent with or after addition of the graft copolymer. Dispersion then is achieved using conventional techniques such as high speed milling, ball milling, sand grinding, attritor grinding, or with a 2 or 3 roll mill.

Preferred formulations for inks adapted for ink jet applications are as follows, with percentages being weight percent of the total ink composition:

(a) aqueous carrier medium: approximately 70 to 99.8%, preferably 94 to 99.8%, when an organic pigment is selected; approximately 25 to 99.8%, preferably 70 to 99.8% when an inorganic pigment is selected;

(b) pigments: up to approximately 30% pigment by weight for organic pigments, but generally in the range of approximately 0.1 to 15%, preferably 0.1 to 8%; with inorganic pigments (which have higher specific gravities), higher concentrations are employed, and may be as high as 75% in some cases.

(c) graft polymer: approximately 0.1 to 30%, preferably in the range of 0.1% to 8%.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C.

Industrial Applicability

The graft polymers of the invention may be designed to provide excellent dispersing power for organic and inorganic solids in aqueous media, or mixed aqueous-organic media. The dispersions with improved properties are particularly useful for coating applications such as paints and color films for imaging applications. They are also very useful for various types of inks, in particular, ink jet inks.

The following examples further illustrate but do not limit the invention.

EXAMPLES

Glossary

BzMA Benzyl methacrylate
ETEGMA Ethoxytriethylene glycol methacrylate
MAA Methacrylic acid
VAZO® 52 E. I. DuPont de Nemours and Company, Wilmington, Del.
AMPS 2-Acrylamido-2-methyl-1-propanesulfonic acid
MA Methyl acrylate
Lupersol® 11, Atochem Of North America, Inc., Buffalo, N.Y.

Preparation of Macromonomer 1

This shows the preparation of a macromonomer BzMA/ETEGMA/MAA (70/20/10):

To a 5-liter flask equipped with a mechanical stirrer, thermometer, N2 inlet, and addition funnels was charged 350.0 g of BzMA, 100.0 g of ETEGMA, 50.0 g of MAA, 750.0 g of acetone and 0.08 g of Diaquabis (borondifluorodiphenyl-glyoximato) cobalt(II), Co(DPG-BF2). The reaction mixture was heated to the reflux temperature (62° C.) and 20.0 g of VAZO® 52 and 0.04 g Co(DPG-BF2) dissolved in 200.0 g of acetone were fed over 240 min together with the monomer mixture of 350.0 g of BzMA, 100.0 g of ETEGMA and 50.0 g of MAA. The reaction was finished off by addition of 5.0 g of Vazo® 52 dissolved in 50.0 g of acetone and the reflux was maintained for additional 120 minutes. The reaction mixture had 50.84% solids.

Preparation of Graft Polymer

This shows the preparation of an anionic sulfonic-acid containing polymer, AMPS/MA//-g-BzMA/ETEGMA/MAA 25/50//-g-17.5/5/2.5 graft copolymer:

To a 5-liter flask equipped with a mechanical stirrer, thermometer, N2 inlet, and additional funnels was charged, 200.0 g of AMPS, 275.0 g of isopropanol, 137.5 g of water, 400.0 g of methyl acrylate, 287.5 g of acetone, 400.0 g of 2-pyrrolidone and 400.0 g of macromonomer solution prepared as described above. The contents of the flask were heated to the reflux temperature (72° C.) and 7.5 g of Lupersol® 11 free radical initiator dissolved in 40.0 g of isopropanol and 40.0 g of acetone was added to start the polymerization reaction. The remaining amount of the monomer solution (1200.0 g) was fed into the reaction flask over 180 minutes together with another charge of the Lupersol® 11 initiator solution. The reaction was finished off by adding an extra 5.0 g of the Lupersol® 11 initiator dissolved in 25.0 g of isopropanol and 25.0 g of acetone. The reaction mixture was kept at the reflux temperature for additional 120 minutes. The resulting polymer solution with 33.46% solids and acid number of 124.2 was neutralized with a solution of KOH in water to 90% of stoichiometry. The volatile solvents were then stripped off (845.0 g) and replaced with the same amount of water, with a final polymer solids of 33.5%.

Dispersion Preparation

This shows the preparation of an anionic sulfonic-acid containing cyan dispersion.

A cyan pigment dispersion was prepared using the following procedure:

| Ingredient | Amount (parts by weight, grams) |
|---|---|
| Endurophthal ® BT-617D (Cookson Pigments Newark, NJ) | 150.0 |
| Graft Polymer (33.5% solids) | 298.5 |
| Deionized water | 1051.5 |
| Total | 1500.0 |

The above mentioned components were premixed in a plastic beaker by mechanical stirring until no lumps or dry clumps were visible. The mixture was dispersed in a ball mill with ceramic media for 48 hours. The resulting pigment dispersion had a 10% pigment concentration.

Ink Preparation

An anionic, sulfonic-acid containing cyan ink jet ink was prepared using the following procedure:

An ink containing 3.0% pigment and 1.5% graft polymer dispersant was prepared by stirring together appropriate quantities of the Pigment Dispersion prepared above, 2-pyrrolidone, Liponics® EG-1, citric acid, and deionized water to make and ink with final concentrations of 5% Liponics® EG-1, 9% 2-pyrrolidone, and 3% citric acid. The inks were printed on Champion Data Copy paper using a Hewlett Packard 1200C printer. Image quality was very good.

What is claimed is:

1. A dispersion comprising an aqueous carrier medium, a particulate solid, and a graft copolymer dispersant consisting essentially of:

(a) a hydrophilic backbone wherein 2 to 100% of the backbone is prepared from monomers containing an acid which, in unneutralized form, has a pKa up to or equal to 3, and wherein the backbone is soluble in water and insoluble in non-polar organic solvents; and (b) at least one discrete hydrophobic side chain, wherein 20 to 100% of the side chain(s) are prepared from non-polar aromatic monomers or aliphatic monomers having a chain length of at least 4 carbon atoms;

wherein (i) at least one side chain has a weight average molecular weight in the range of 1,000 to 30,000 and (ii) the weight ratio of hydrophobic side chain(s) to hydrophilic backbone is in the range of 90:10 to 10:90.

2. The dispersion of claim 1 wherein the weight ratio of hydrophobic side chain(s) to hydrophilic backbone of said graft copolymer is in the range of 20:80 to 50:50.

3. The dispersion of claim 1 wherein at least 20% by weight of monomer used to prepare said hydrophobic side chain(s) of said graft copolymer is selected from the group consisting of aryl esters of acrylic or methacrylic acid, N-aryl acrylamide or methacrylamide, and vinyl aryl esters.

4. The dispersion of claim 3 wherein additional monomer is present during preparation of the graft copolymer to modify physical properties thereof.

5. The dispersion of claim 4 wherein said additional monomer is selected from the group consisting of alkyl esters of acrylates or methacrylates, N-alkyl substituted acrylamides or methacrylamides, and vinyl alkyl esters.

6. The dispersion of claim 4 wherein said additional monomer includes a hydrophilic ionic monomer up to 20% by weight, based on the total weight of said graft copolymer.

7. The dispersion of claim 4 wherein said additional monomer includes a hydrophilic non-ionic monomer.

8. The dispersion of claim 4 wherein said additional monomer has at least one functional group that binds to particulate solids.

9. The dispersion of claim wherein said hydrophilic backbone of said graft/copolymer contains a monomer selected from the group consisting of:

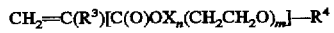

wherein n is 0 or 1; when n is 1, X is an alkyl, aryl, or alkylaryl diradical connecting group of 1 to 9 carbon atoms; m is 1 to 100, $R^3$ is H or $CH_3$; and $R^4$ is selected from the group consisting of H and alkyl groups of 1 to 4 carbon atoms.

* * * * *